(No Model.)
W. E. SIMONDS.
CENTRIFUGAL SEPARATOR.
No. 566,807. Patented Sept. 1, 1896.
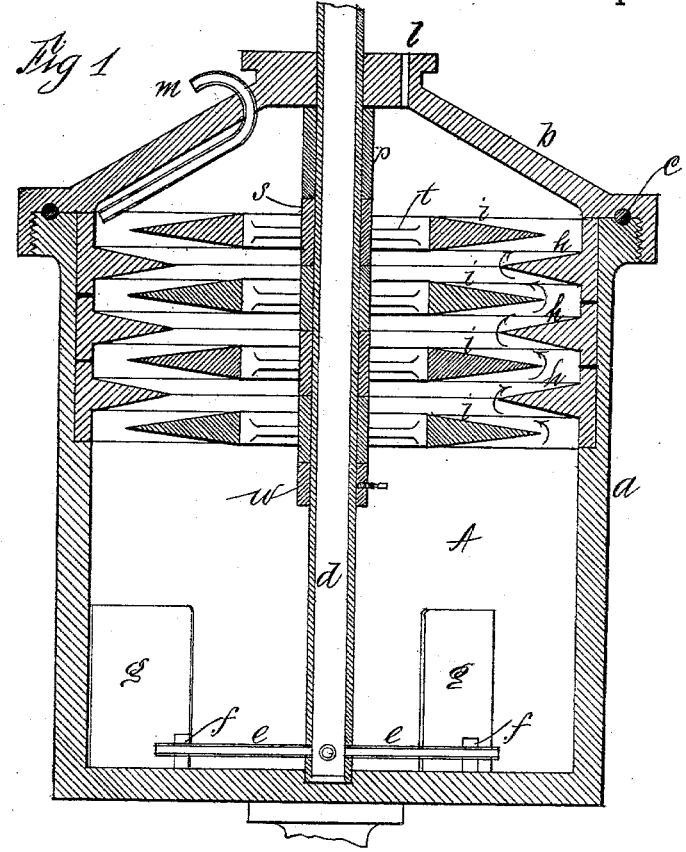
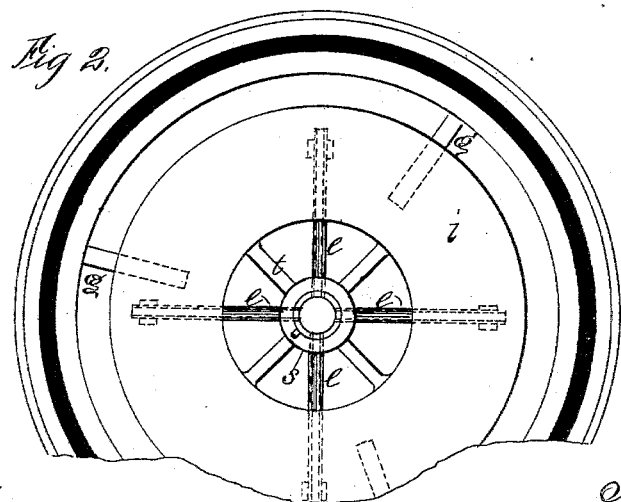
Witnesses
Andrew Ferguson
John P. Healy
Inventor
William Edgar Simonds

UNITED STATES PATENT OFFICE.

WILLIAM EDGAR SIMONDS, OF CANTON, CONNECTICUT.

CENTRIFUGAL SEPARATOR.

SPECIFICATION forming part of Letters Patent No. 566,807, dated September 1, 1896.

Application filed January 18, 1895. Serial No. 535,389. (No model.)

*To all whom it may concern:*

Be it known that I, WILLIAM EDGAR SIMONDS, a citizen of the United States of America, residing at Canton, in the county of Hartford and State of Connecticut, have invented a certain new and useful Improvement in Centrifugal Separators for Separating Intermixed Liquids of Different Densities, notably cream from the more watery constituents of whole milk, of which the following is a description, reference being had to the accompanying sheet of drawings, whereon—

Figure 1 is an elevation view, mainly in central vertical section, of a separator-drum embodying said improvement. Fig. 2 is a plan view of the same device with the cover removed.

This description does not include any reference to some necessary but well-known features of centrifugal separators, as, for instance, the accurately-correct location of the cream-outlet.

The letter $a$ denotes the body of a swiftly-rotating separator-drum, $b$ a cover screwing thereupon, and $c$ a packing-ring for the joint between the two. The whole milk enters through the tube $d$, which is socketed at its foot in the floor of the drum, and escapes into the separating-space through the feed-tubes $e$, which rest between pins $f$, rising from the drum-floor, whereby all these tubes are made to rotate with the drum. Wings $g$ insure the rotation of the milk with the drum.

Under centrifugal force the heavier portions of the milk, the watery constituents, move outwardly, seeking the inner wall of the drum, and in so doing force the cream into a core along the vertically-central part of the drum. The lower part of the space in the drum is in the main open and free, and in this open separating-space (lettered A) the separation of the greater part of the cream from the more watery constituents of the milk is effected. Then comes into play the action of new devices, whose tendency is to force such watery constituents to give up whatever of cream they may still retain in their grasp.

The letters $h$ denote outer rings, which in their shape and location are circumferential as regards the space inclosed by the drum, and the letters $i$ denote inner rings. These two sets of rings alternate in vertical position and they overlap, in a vertical sense, thus forming between them a continuous, tortuous, or zigzag path for the liquid, as denoted by the arrows, the general trend of which is vertical. In the travel of the milk along this tortuous path it is the tendency of the watery constituents to seek the outer boundary of the path, forcing the cream to the inner. This action has the freer play because of the thin body of the stream, and it is accentuated at each reversal of the direction of the current. This action is perfected by the presence of the inner rings. The escape of the freed particles of cream into the central cream-core is permitted and facilitated by the openings or passages between or through the inner rings. The flow of the current along this tortuous path is facilitated by beveling the faces of the rings, as shown in the drawings. The cream escapes from the drum through cream-duct $l$ and the watery constituents through blue-milk ducts $m$, which last are preferably plural in number and located at regular intervals of the circle.

Each outer ring is integral with a hoop-like base. These rest one upon the other. The lowest rests on an annular shoulder in or on the inner wall of the drum. All are removable from the drum. They are held down to place by the cover $b$.

Each inner ring is a part of a wheel-like structure, the letters $t$ denoting the spokes thereof and $s$ the hub encircling the tube $d$. These rest one upon the other. The lowermost rests on collar $u$, which is secured to the tube $d$, as by a set-screw. These wheels are compelled to rotate with the tubular shaft $d$ by means of a spline-and-feather device or other equivalent means well known to those skilled in the mechanical arts. All are removable from the drum and from the tube, (for this purpose a shaft) $d$. The sleeve $p$, loose on tube $d$, confines these "wheels" against rising out of place.

I claim as my improvement—

1. In combination, the rotary drum provided with inlet for full milk and separate outlets for blue milk and cream, the circumferential rings $h$ projecting inwardly from the drum, and the inner rings $i$ overlapping the rings $h$ and adapted to form therewith a continuous zigzag passage for the liquid, all substantially as described and for the purposes set forth.

2. In combination, the rotary drum provided with inlet for full milk and separate outlets for blue milk and cream, the circumferential rings $h$ projecting inwardly from the drum, the inner rings $i$ adapted to form with the rings $h$ a continuous zigzag passage for the liquid with passages therefrom to the more central space of the drum, all substantially as described and for the purposes set forth.

3. In a centrifugal separator, in combination with the outer wall of the drum or bowl, the removable circumferential rings $h$, having hoop-like bases resting upon each other, and bevel-faced, sharp-edged webs, substantially as and for the purposes set forth.

4. In a centrifugal separator, in combination, the drum $a$, the removable circumferential rings $h$, sustained upon the outer wall of the drum, having hoop-like bases resting upon each other and bevel-faced sharp-edged webs, and the removable inner rings $i$, sustained upon the central tubular shaft $d$, substantially as and for the purposes set forth.

5. In a centrifugal separator, the removable bevel-faced sharp-edged rings $i$ sustained in a vertical series on the central tubular shaft $d$ and alternating with the circumferential rings $h$, forming therewith a tortuous zigzag path for the liquid, substantially as and for the purposes set forth.

WILLIAM EDGAR SIMONDS.

Witnesses:
FRANK E. HEALY,
ANDREW FERGUSON.